United States Patent
Menon (10) Patent No.: US 11,032,147 B2
(45) Date of Patent: *Jun. 8, 2021

(54) ACCELERATION OF NODE CONFIGURATION FOR TWAMP WITH A LARGE NUMBER OF TEST SESSIONS

(71) Applicant: Spirent Communications, Inc., San Jose, CA (US)

(72) Inventor: Jyotikumar U. Menon, Clarksburg, MD (US)

(73) Assignee: Spirent Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,717

(22) Filed: Jun. 22, 2020

(65) Prior Publication Data

US 2020/0322220 A1 Oct. 8, 2020

Related U.S. Application Data (63) Continuation of application No. 15/919,105, filed on Mar. 12, 2018, now Pat. No. 10,693,729.

(51) Int. Cl.
*G06F 13/00* (2006.01)
*H04L 12/24* (2006.01)
(Continued)

(52) U.S. Cl.
CPC ........ *H04L 41/0889* (2013.01); *H04L 41/083* (2013.01); *H04L 41/0823* (2013.01);
(Continued)

(58) Field of Classification Search
CPC .............. H04L 41/0889; H04L 41/083; H04L 41/0853; H04L 41/0823; H04L 43/0817;
(Continued)

(56) References Cited

U.S. PATENT DOCUMENTS 8,711,708 B2 4/2014 Wallman
9,485,165 B2 11/2016 Allan et al.
(Continued)

FOREIGN PATENT DOCUMENTS

CN 106534230 A 3/2017
EP 3099016 A1 11/2016

OTHER PUBLICATIONS

Yang by example, https://trac.ietf.org/trac/edu/raw-attachment/wiki/IETF94/94-module-2-yang.pdf, Nov. 5, 2015, 35 pages.
(Continued)

*Primary Examiner* — Kenneth R Coulter
(74) *Attorney, Agent, or Firm* — Haynes Beffel & Wolfeld LLP; Ernest J. Beffel, Jr.; Andrew L. Dunlap (57) ABSTRACT

The disclosed methods for reducing the port setup time for a large number of TWAMP test sessions for performance measurement testing of telecommunication transport networks include parsing a configuration file to populate an accept-port data structure with proposed receiver ports for communication from a session-sender to session-reflectors; repeatedly and in parallel, from a control client, communicating with receiving servers to set up pairwise test sessions using receiver port allocations from the accept-port data structure, and receiving and checking blocks of Accept-Session messages from the receiving server and handling either case of acceptance of the proposed receiver port or of counter proposal of an alternate-and-available port to be used for the measurement session; and allocating the alternate-and-available port and updating the accept-port data structure by storing the alternate-and-available port received in the particular Accept-Session message; and using the stored ports to initiate TWAMP messages in the pairwise test sessions.

20 Claims, 8 Drawing Sheets

(51) Int. Cl.
   H04L 12/26         (2006.01)
   H04L 29/08         (2006.01)
(52) U.S. Cl.
   CPC ...... H04L 41/0853 (2013.01); H04L 43/0817
      (2013.01); H04L 43/50 (2013.01); H04L 67/14
      (2013.01); H04L 43/0864 (2013.01); H04L
                                  43/10 (2013.01)
(58) Field of Classification Search
   CPC ..... H04L 67/14; H04L 43/50; H04L 43/0864;
                                           H04L 43/10
   USPC ........ 709/222, 220, 227, 221, 230, 228, 229
   See application file for complete search history.

(56)                References Cited

U.S. PATENT DOCUMENTS 9,503,344  B2    11/2016   Chakrabarti et al.
   9,531,621  B2    12/2016   Kolhi et al.
   9,654,370  B2     5/2017   Welin et al.
   9,705,769  B1     7/2017   Sarangapani et al.
  10,613,958  B2 *   4/2020   Grinkemeyer ........ H04L 63/029
  10,693,729  B2 *   6/2020   Menon ................... H04L 67/14
  10,841,196  B2 *  11/2020   Menon ................... H04L 43/087
  10,848,372  B2 *  11/2020   Menon ................ H04L 45/7453
  2007/0288552  A1  12/2007   Snyder
  2009/0279441  A1  11/2009   Wong et al.
  2009/0285575  A1  11/2009   Abidi et al.
  2013/0088977  A1   4/2013   Baillargeon
  2014/0029441  A1   1/2014   Nydell
  2014/0029442  A1   1/2014   Wallman
  2014/0119221  A1   5/2014   Park et al.
  2014/0169183  A1   6/2014   Allan et al.
  2014/0211636  A1   7/2014   Robitaille
  2014/0226507  A1   8/2014   Bonnier et al.
  2014/0258524  A1   9/2014   Thyni et al.
  2014/0301215  A1  10/2014   Somoskoi et al.
  2015/0056995  A1   2/2015   Baillargeon
  2016/0028603  A1   1/2016   Chakrabarti et al.
  2016/0191367  A1   6/2016   Mirsky et al.
  2016/0218927  A1   7/2016   Johnsson et al.
  2016/0352865  A1  12/2016   Gupta et al.
  2017/0019323  A1   1/2017   Allan et al.
  2017/0289011  A1  10/2017   Johnsson et al.
  2018/0165693  A1   6/2018   Jain et al.
  2018/0270149  A1   9/2018   Jiao et al.
  2018/0375753  A1  12/2018   Mirsky et al.
  2019/0059008  A1   2/2019   Liu

OTHER PUBLICATIONS

"TWAMP Explained Measuring Performance in IP Networks", RAD www.rad.com, Sep. 2014, pp. 1-11.
Mirsky, et al., "Two-Way Active Measurement Protocol (TWAMP) Light Data Model", Network Working Group, Jun. 28, 2016, Internet draft valid for 6 months, http://datatracker.ietf.org/drafts/current/, 21 pages.
Clark, "RFC 813 Window and Acknowledgement Strategy in TCP", MIT Laboratory for Computer Science Computer Systems and Communications Group, Jul. 1982, 22 pages.
"RFC 793—Transmission Control Protocol", DARPA Internet Program, Protocol Specification, Sep. 1981, 90 pages.
Civil, et al., "Two-Way Active Measurement Protocol (TWAMP) Data Model", draft-ietf-ippm-twamp-yang-05, Oct. 18, 2017, Internet draft valid for 6 months, http://datatracker.ietf.org/drafts/current/ Draft, 65 pages.
Hedayat, et al., A Two-Way Active Measurement Protocol (TWAMP), Network Working Group, Standards Track, Copyright (c) The IETF Trust (2008), Oct. 2008, 26 pages.
"Zero-touch Network and Service Management—Introductory White Paper", Miscellaneous Contributing Organisations & Authors, available at this link: https://portal.etsi.org/TBSiteMap/ZSM/OperatorWhitePaper, Dec. 7, 2017, 5 pages.
Morton, "RFC 6673 Round-Trip Packet Loss Metrics", ISSN: 2070-1721, AT&T Labs, Internet Engineering Task Force (IETF), https://tools.ietf.org/html/rfc6673, Aug. 2012, 28 pages.
Demichelis, et al., "RFC 3393 IP Packet Delay Variation Metric for IP Performance Metrics (IPPM)", Network Working Group, https://tools.ietf.org/html/rfc3393, Nov. 2002, 42 pages.
Mills, "RFC 1305 Network Time Protocol (Version 3) Specification, Implementation and Analysis", Network Working Group, Electrical Engineering Dept., University of Delaware, mills@udel.edu, Mar. 1992, 115 pages.
"Test and Monitoring Solutions for SDN and DNFV Network Operations", Spirent, spirent.com, Jun. 9, 2016, pp. 1-8.
"ETSI GS NFV-REL 004 V1.1.1", Network Functions Virtualisation (NFV); Assurance; Report on Active Monitoring and Failure Detection, http://www.etsi.org/standards-search, Apr. 2016, pp. 1-61.
Ersue, "ETSI NFV Management and Orchestration—An Overview", IETF #88, Vancouver, Canada, Published E2E Arch, REQ, Use Case,Terminology documents in ETSI NFV Open Area: http://docbox.etsi.org/ISG/NFV/Open/Published/, Jan. 2, 2014, 14 pages.
U.S. Appl. No. 15/936,346—Office Action dated Jun. 21, 2019, 32 pages.
"RFC 5938—Individual Session Control Feature for the Two Way Active Measurement Protocol (TWAMP)", Internet Engineering Task Force (IETF), Aug. 2010, 17 pages.
"RFC 5357—A Two-Way Active Measurement Protocol (TWAMP)", Network Working Group, Oct. 2008, 26 pages.
"DLPs A300 to A399", Cisco ONS 15454 Procedure Guide Release R5.0, Mar. 2005, 102 pages.
"RFC 7750—Differentiated Service Code Point and Explicit Congestion Notification Monitoring", Internet Engineering Task Force (IETF), Feb. 2016, 11 pages.
U.S. Appl. No. 15/919,135—Office Action dated Aug. 15, 2019, 21 pages.
U.S. Appl. No. 15/919,039—Non-Final Office Action dated Nov. 14, 2019, 12 pages.
U.S. Appl. No. 15/919,039—Response to Non-Final Office Action dated Nov. 14, 2019 filed Dec. 27, 2019, 14 pages.
U.S. Appl. No. 15/936,346—Response to Office Action dated Jun. 21, 2019 filed Jan. 7, 2020, 24 pages.
U.S. Appl. No. 15/919,039—Notice of Allowance dated Jan. 17, 2020, 11 pages.
U.S. Appl. No. 15/919,135—Response to Office Action dated Aug. 15, 2019 filed Jan. 17, 2020, 35 pages.
U.S. Appl. No. 15/919,105—Notice of Allowance dated Feb. 7, 2020, 26 pages.
U.S. Appl. No. 15/936,346—Final Office Action dated Apr. 9, 2020, 40 pages.
U.S. Appl. No. 15/919,135—Final Office Action dated Mar. 16, 2020, 22 pages.
U.S. Appl. No. 15/936,346—Notice of Allowance dated Jul. 9, 2020, 11 pages.
U.S. Appl. No. 15/936,346—Response to Final Office Action dated Apr. 9, 2020, filed Jun. 24, 2020, 13 pages.
U.S. Appl. No. 15/919,135—Notice of Allowance dated Jul. 17, 2020, 11 pages.
U.S. Appl. No. 15/919,135—Response to Final Office Action dated Mar. 16, 2020, filed May 11, 2020, 12 pages.
U.S. Appl. No. 15/919,039, filed Mar. 12, 2018, US10,613,958, Apr. 7, 2020, Granted.
U.S. Appl. No. 16/841,623, filed Apr. 6, 2020, Pending.
U.S. Appl. No. 15/919,135, filed Mar. 12, 2018, US10,848,372, Nov. 24, 2020, Granted.
U.S. Appl. No. 17/103,592, filed Nov. 24, 2020, Pending.
U.S. Appl. No. 15/936,346, filed Mar. 26, 2018. US10,841,196, Nov. 17, 2020, Granted.
U.S. Appl. No. 15/936,346, filed Nov. 17, 2020, Pending.

* cited by examiner

FIG. 7
(PRIOR ART) Internet Protocol for TCP Header Fields

FIG. 8
(PRIOR ART) Internet Protocol for IP Header Fields

| 1 (1 byte) | MBZ (4 bits) | IPVPN (4 bits) | Conf-Sender (1 byte) | Conf-Receiver (1 byte) |
|---|---|---|---|---|
| Number of Schedule Slots (4 bytes) ||||
| Number of Packets (4 bytes) ||||
| Sender Port (2 bytes) ||| Receiver Port (2 bytes) |
| Sender Address (4 bytes) ||||
| Sender Address or MBZ (12 bytes) ||||
| Receiver Address (4 bytes) ||||
| Receiver Address or MBZ (12 bytes) ||||
| SID (16 bytes) ||||
| Padding Length (4 bytes) ||||
| Start Time (4 bytes) ||||
| Timeout (8 bytes) ||||
| Type-P Descriptor (4 bytes) ||||
| MBZ (8 bytes) ||||
| HMAC (16 bytes) ||||

FIG. 9
(PRIOR ART) TWAMP-Control Request TW-Session Message Fields

| Accept (1 byte) | MBZ (1 byte) | Port (2 bytes) |
|---|---|---|
| SID (16 bytes) |||
| MBZ (12 bytes) |||
| HMAC (16 bytes) |||

FIG. 10
(PRIOR ART) TWAMP-Control Accept TW-Session Message Fields

FIG. 11

ACCELERATION OF NODE CONFIGURATION FOR TWAMP WITH A LARGE NUMBER OF TEST SESSIONS

CROSS-REFERENCE TO RELATED APPLICATIONS

This application is a continuation of U.S. Application No. 15,919,105, entitled ACCELERATION OF NODE CONFIGURATION FOR TWAMP WITH A LARGE NUMBER OF TEST SESSIONS, filed 12 Mar. 2018, now U.S. Pat. No. 10,693,729, which is hereby incorporated by reference in its entirety.

INCORPORATION OF RELATED APPLICATIONS

The following materials are incorporated by reference as if fully set forth herein:

This application is filed contemporaneously with a related U.S. application Ser. No. 15/919,039, entitled "SECURE METHOD FOR MANAGING A VIRTUAL TEST PLATFORM", filed on 12 Mar. 2018, now U.S. Pat. No. 10,613,958; and This application is filed contemporaneously with a U.S. application Ser. No. 15/919,135, entitled "SCALABILITY, FAULT TOLERANCE AND FAULT MANAGEMENT FOR TWAMP WITH A LARGE NUMBER OF TEST SESSIONS", filed on 12 Mar. 2018, now U.S. Pat. No. 10,848,372.

FIELD OF THE TECHNOLOGY DISCLOSED

The technology disclosed relates generally to performance measurement of telecommunication transport networks with a large number of test sessions.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

For existing performance measurement testing of telecommunication transport networks, destination port numbers for test sessions must be set up prior to initiating tests. Setup of the ports in the existing systems must wait for the server to acknowledge the availability of each of the port numbers—typically sequentially, before starting test sessions.

In contrast to existing methods, the disclosed technology reduces the delay associated with setting up the ports for performance measurement testing by amortizing the cost of waiting for the acknowledgements of available ports over multiple port setup requests for ports that will be used for test sessions.

An opportunity arises to increase the speed of node configuration for performance measurement testing of telecommunication transport networks by more than thirty times, when implementing thousands of test nodes. This increase in node configuration speed reduces the port setup time, making it practical to implement performance measurement testing on a large scale.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of the summary is to present some concepts related to some exemplary non-limiting implementations in a simplified form as a prelude to the more detailed description of the various implementations that follow.

The disclosed technology teaches a method of reducing the setup time of Two-Way Active Measurement Protocol (abbreviated TWAMP) control phase of the TWAMP protocol including at a first network host, initializing an accept-port data structure for storing ports of transmitted request messages for two way (abbreviated TW) measurement sessions. The method includes parsing a configuration file to populate the accept-port data structure, including proposed receiver ports for communication from a session-sender on the first network host to session-reflectors on other hosts; and repeatedly and in parallel, from a control client running on the first network host, communicating with receiving servers to set up pairwise test sessions between the session-sender and the session-reflectors using receiver port allocations from the accept-port data structure, for TW measurements that distinguish among the sessions, including transmitting a first message to a receiving server at the session-reflector, requesting the TW measurement session, wherein the first message includes the proposed receiver port at which to contact the session-reflector. The method further includes receiving and checking blocks of Accept-Session messages from the receiving server at the session-reflector and handling either case of acceptance of the proposed receiver port or of counter proposal of an alternate-and-available port, in which the counter proposal of the alternate-and-available port in a particular Accept-Session message includes an alternate-and-available port from the receiving server to be used for the TW measurement session, instead of the proposed receiver port, and allocating the alternate-and-available port and updating the accept-port data structure by storing the alternate-and-available port received in the particular Accept-Session message. The disclosed method also includes using the ports stored in the accept-port data structure to initiate TWAMP messages in the pairwise test sessions.

Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Two-Way Active Measurement Protocol (TWAMP) has been standardized, by the Internet Engineering Task Force (IETF), for characterizing the performance measurement of telecommunication transport networks. TWAMP is a protocol for measuring two-way performance metrics between network devices. Two-way measurements, also referred to as round-trip, are common in IP networks primarily because synchronization between local and remote clocks is unnecessary for round-trip delay, and measurement support at the remote end may be limited to a simple echo function.

The TWAMP protocol has a TWAMP-Control phase and a TWAMP-Test phase. The TWAMP-Control phase is used to initiate, start and stop test sessions between control-client and server logical entities. The TWAMP-Test phase is used to exchange test packets and measure network performance metrics between the Session-Sender and Session-Reflector logical entities.

The TWAMP-Control phase must be completed before the TWAMP-Test phase for performance measurement can start. Hence it is necessary that the TWAMP-Control phase be completed as quickly as possible.

In existing performance measurement testing, when the control-client sends a Request-TW-Session message, with the destination UDP port number to use for a test session, it must wait for the server to acknowledge the availability of this UDP port number, via the Accept-Session message. Since one Accept-Session message uses only 48 bytes, the standard TCP congestion control mechanism forces this message to be delayed for the duration of the delayed ACK timer which has a limit of 500 milliseconds. This means that succeeding Request-TW-Session messages are delayed for up to 500 milliseconds to wait for the acknowledgment in the Accept-Session message. This introduces large delays in the TWAMP-Control phase when setting up a large number of test sessions.

In contrast to existing methods, the disclosed technology reduces the delay associated with the TWAMP-control phase by amortizing the cost of the delayed ACK timer over several Request-TW-Session messages that specify the ports that will be used for multiple test sessions.

The disclosed technology described herein can reduce the setup time of the TWAMP-Control phase of the TWAMP protocol, when implementing 3000 test nodes using TWAMP, to ten to twelve seconds instead of the thirty to forty minutes required previously. This scale of increase in the speed of node configuration for performance measurement (PM) testing of telecommunication transport networks can make it practical to implement PM testing on a large scale. The systems and methods for reducing the setup time of TWAMP control phase of the TWAMP protocol are described next.

Figure 1:
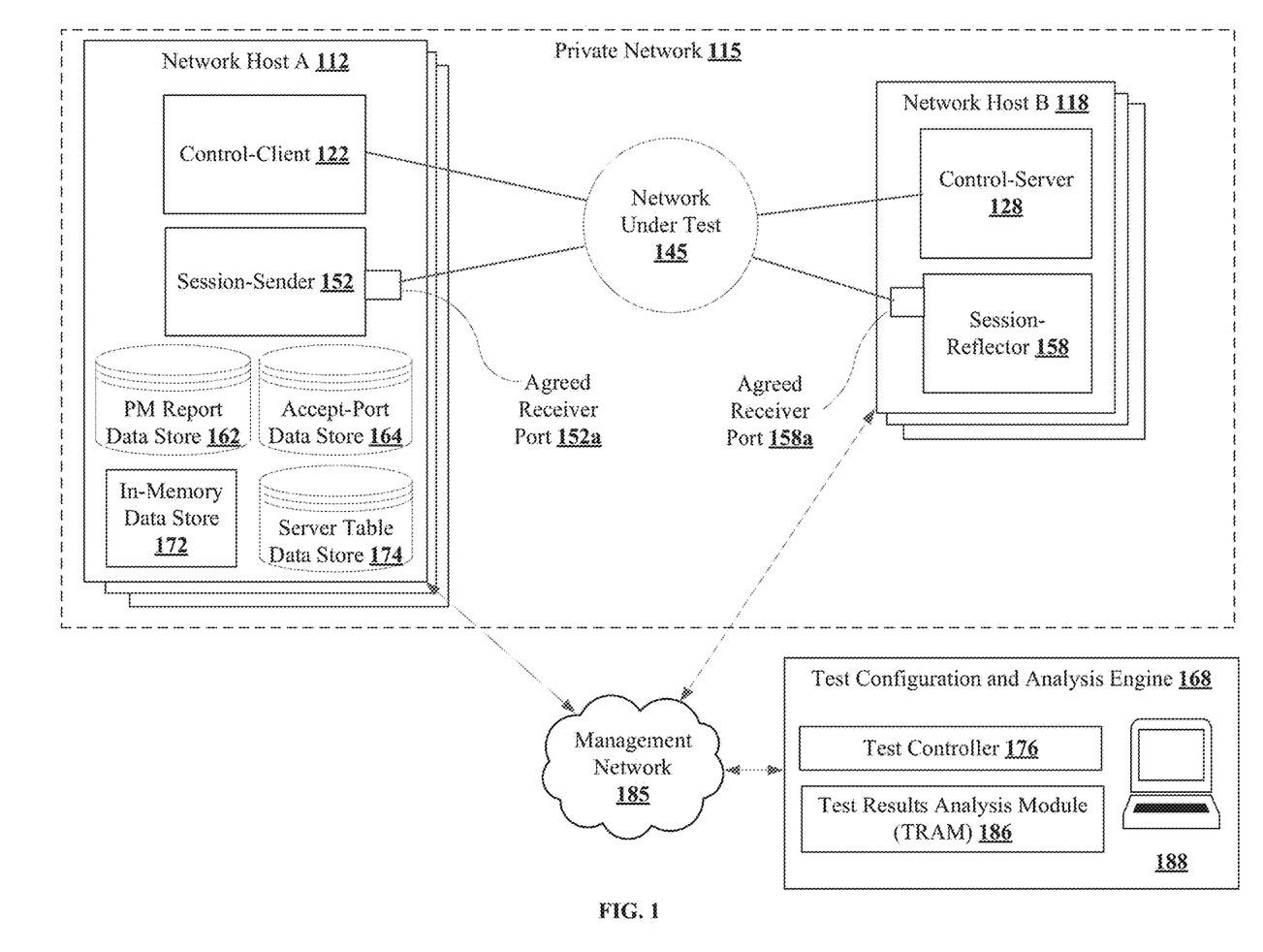
FIG. 1 depicts an exemplary system for increasing the speed of node configuration for performance measurement testing of telecommunication transport networks by reducing the port setup time for TWAMP with a large number of test sessions, according to one implementation of the technology disclosed.

FIG. 1 shows example architecture 100 for increasing the speed of node configuration for performance measurement (PM) testing of telecommunication transport networks by reducing the port setup time for TWAMP with a large number of test sessions. Architecture 100 includes network host A 112 with control-client 122 and session-sender 152 with agreed receiver port 152a, and network host B 118 with control-server 128 and session-reflector 158 with agreed receiver port 158a. Control-client 122 and session-sender 152 logical entities reside in one network host and the receiving server 128 and session-reflector 158 logical entities in another network host with the network whose performance is being measured between these two hosts, as shown in FIG. 1. Control-client 122 initiates a transmission control protocol (TCP) connection; receiving server 128 acknowledges the request for connection; session-sender 152 initiates a test using the agreed receiver port 152a specified in the acknowledgement message from the receiving server 128; and session-reflector 158 responds to incoming TWAMP test sessions via the same agreed receiver port 158a. A single set of components is discussed as representative of the functionality common to hundreds to thousands of control-clients and servers. Hundreds to thousands of control-clients, session-senders, servers and session-reflectors are represented in FIG. 1 via the cascading hosts. In one implementation, control-clients, session-senders, servers and session-reflectors can be resident on a single host.

In software-defined networking (SDN) and network-function virtualization (NFV) environments, network host A 112 and network host B 118 can be virtual test platforms (VTPs) and control-client 122 and receiving server 128 can run as virtual test applications (VTAs) on virtual network functions (VNFs) inside a virtual machine (VM) or in a Docker container running on a physical host. The VM is a self-contained environment with its own operating system (VMOS) separate from the host operating system which runs the hypervisor and controls the VMs. Each VM has its own processor address space, memory address space and networking address space with network layer resources including Internet Protocol (IP) addresses and transport layer resources including TCP or UDP port numbers. A Docker container is a lightweight self-contained environment sharing the host operating system, but with its own processor address space, memory address space and networking address space with network layer resources including IP addresses and transport layer resources including TCP or UDP port numbers.

Continuing with the description of FIG. 1, network host A 112 includes accept-port data store 164 for storing proposed User Datagram Protocol (UDP) ports transmitted in request messages from control-client 122 to session-sender 152 for two way sessions, indexed by an order in which the ports for test sessions are allocated. Accept-port data store 164 also includes counter-proposed alternate-and-available UDP ports returned by receiving server 128. Network host A 112 also includes server hash table data store 174 for storing server and test session information for VTAs, to be used for TWAMP testing. Additionally, FIG. 1 shows network-under-test 145, which can use NFV architecture comprising virtualized routers and switches, an SDN architecture in which the control plane and data plane are separated into white box routers and switches, or a conventional network architecture comprising routers and switches. Additionally, FIG. 1 shows network under test 145.

Also included in architecture 100 is management network 185 through which test configuration and analysis engine 168 communicates with the TWAMP control-clients in network host A 112 and TWAMP control-servers in network host B 118. —including configuration files for TWAMP servers to be used in TWAMP tests. Test configuration and analysis engine 168 includes test controller 176, test results analysis module (TRAM) 186, and performance measurement (PM) report data store 162.

An operator specifies testing details such as how many test sessions for which nodes, by setting up the configuration file for the network to be tested, via user interface 188. In some implementations, multiple network operators, each setting up configuration files for testing systems in their own company's network name spaces, could utilize multiple test controllers to configure tests for multiple networks. Test controller 176 sends the completed configuration file to control-client 122, which parses the configuration file and creates an in-memory data store with accept-port data structure content and server hash table data store content.

When session tests are complete, control-client 122 stores the performance measurement results in PM report data store 162 and sends the performance metric session test results to TRAM 186 for use by test controller 176 in analyzing the network under test. In one implementation, TRAM 186 is an integral part of test configuration and analysis engine 168 that collects or receives test results from the network hosts and analyzes test results and presents the results to an operator in an actionable format via user interface 188. In one implementation, the reports can be very large and they get generated often—potentially every one minute, two minutes or ten minutes, depending on the configuration parameters set by the operator to test the specific network. For example, testing of a network with three thousand nodes with 120 kB per five minutes for each node produces billions of bytes of test results per twenty-four hour period. In some implementations the report data gets analyzed via big data analytics.

In some implementations, test controller 176 manages the test agents and probes, providing test instructions to the test probes, coordinating the test scheduling when multiple tests with large number of test probes are executed, and retrieving results from TRAM 186 to provide actionable information to the network operator.

In a public network setting, it would be unfair to hog resources by flooding the network with requests without waiting for acknowledgment. Because the TWAMP control setup is being utilized for private network 115, there is no fairness issue of "hogging" TCP resources, as could occur on a public network environment in which a wide range of customers utilize limited TCP resources.

Figure 2:
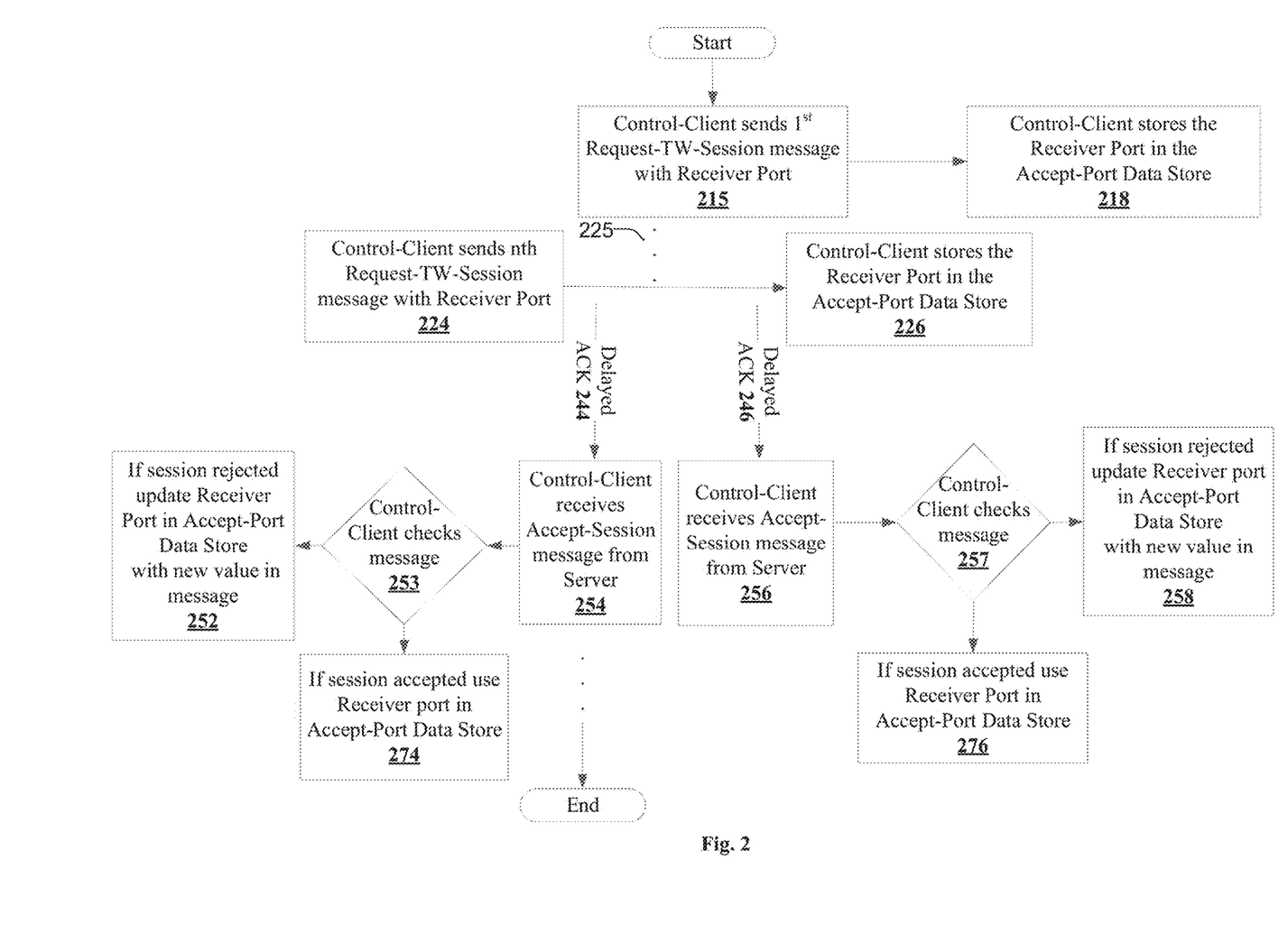
FIG. 2 depicts a flow diagram for the disclosed enhanced TWAMP control setup.

FIG. 2 shows the flow diagram for the disclosed enhanced TWAMP control setup. Control-client 122 sends $1^{st}$ Request-TW-Session message with reflector port 215 to receiving server 128, and control-client 122 stores the reflector port 218 in accept-port data store 164. Similarly, control-client 122 sends nth Request-TW-Session message with Receiver Port 224 to server 128, without waiting for an acknowledgement ACK for previously-sent Request-TW-Session messages. Control-client 122 stores the receiver port 226 in accept-port data store 164. That is, instead of waiting for the corresponding Accept-Session messages from the server, Control-client 122 also sends $2^{nd}$ through nth Request-TW-Session messages with respective receiver ports and stores the respective receiver ports in accept-port data store 164, as represented by the three dots 225. The server follows the delayed ACK mechanism described in RFC 813 *"WINDOW AND ACKNOWLEDGEMENT STRATEGY IN TCP"* and sends a single TCP segment which contains as many Accept-Session messages as will fit in the maximum segment size (MSS) as specified in RFC 793 *"TRANSMISSION CONTROL PROTOCOL"*. Control-client 122 receives these Accept-Session message packets. Packets are also referred to as blocks in this application.

Continuing with the description of the flow diagram in FIG. 2, upon receipt of delayed ACK 244, 246, control-client 122 receives the accept-session messages from the receiving server 254, 256. Control-client 122 checks the messages 253, 257. If a session was rejected, then control client 122 updates the receiver port stored in accept-port data store 164 with the alternate-and-available port value received in the accept-session message with a rejected port. Alternatively, if the session was accepted, then control-client 122 continues to use the proposed receiver port 274, 276 stored in accept-port data store 164.

Figure 3:
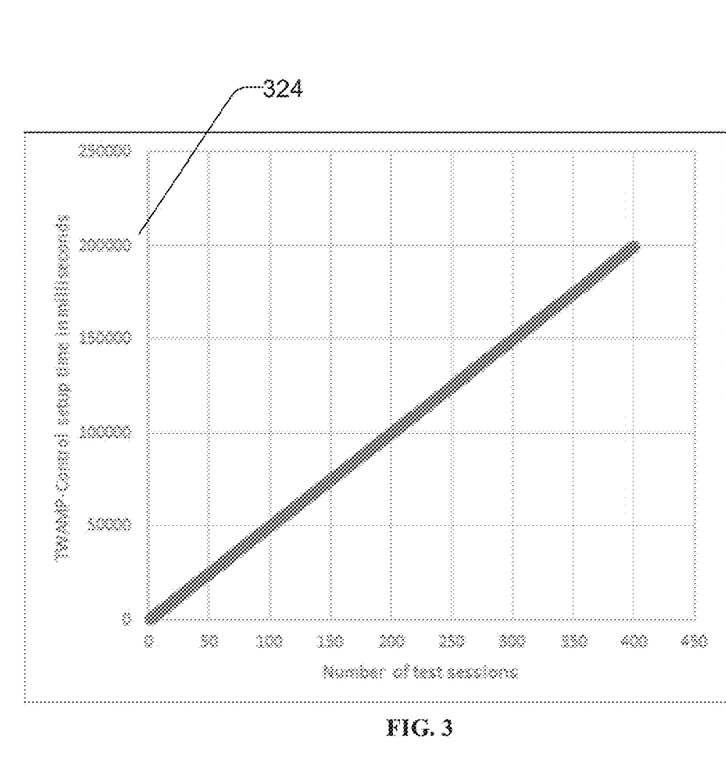
FIG. 3 shows a graph of the calculated TWAMP control setup time, in milliseconds by number of test sessions, for the original control setup.

FIG. 3 shows a graph of the calculated TWAMP control setup time, in milliseconds by number of test sessions, for the original control setup in which a control-client waits for the ACK from the server to acknowledge the availability of the UDP port number in the Accept-Session message before sending the next Request-TW-Session message. The detailed calculation for the plot is described for round trip time (RTT) between control-client and server equal to r, time to transmit all of the other TWAMP-control messages represented by a constant c, and the delayed ACK time D. Then TWAMP-Control setup time S=n*D+r+c, with n=400 test sessions, D=500 ms and r+c=100 ms. The control setup time is more than three minutes at 200,100 seconds 324 for 400 test sessions.

Figure 4:
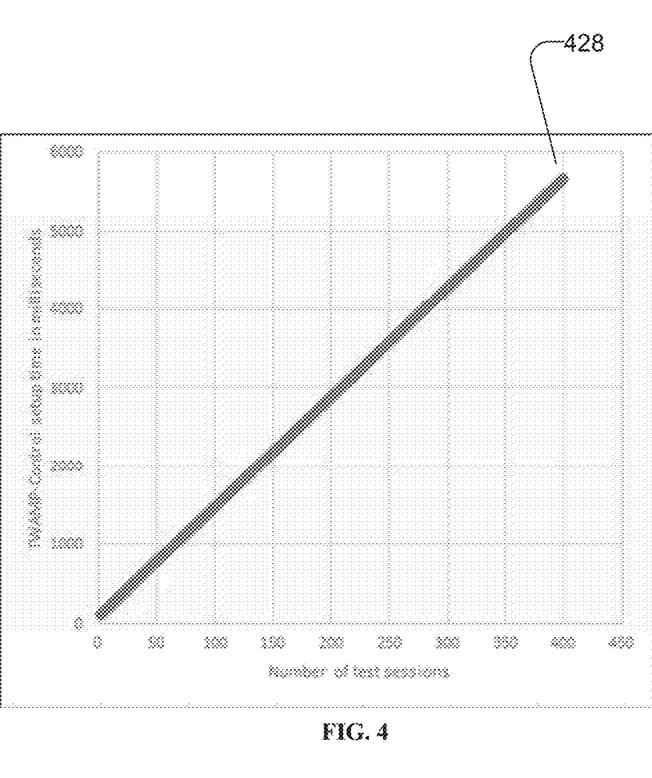
FIG. 4 shows a graph of the calculated TWAMP control setup time for the disclosed control setup, in milliseconds by number of test sessions.

FIG. 4 shows a graph of the calculated TWAMP control setup time, in milliseconds by number of test sessions, for the disclosed control setup. A comparison of the graph in FIG. 3 to the graph of FIG. 4 shows the vast acceleration of control setup calculated for the disclosed control setup implementation—approximately 5600 seconds 428 are required to set up 400 test sessions. The comparison between 200,100 seconds 324 and 6,766 seconds 428 shows the increased speed of node configuration, showing its practicality for use on a large scale.

Figure 7:
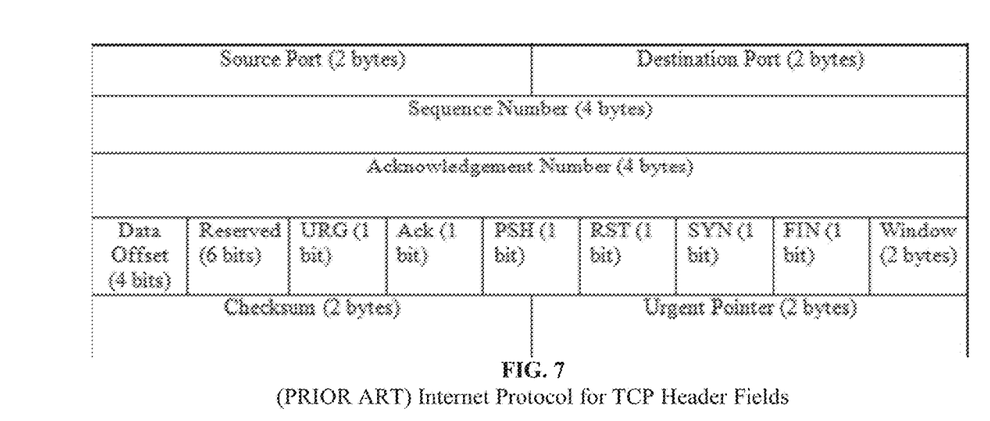
FIG. 7 shows standard Internet protocol for TCP header fields, for reference.
Figure 8:
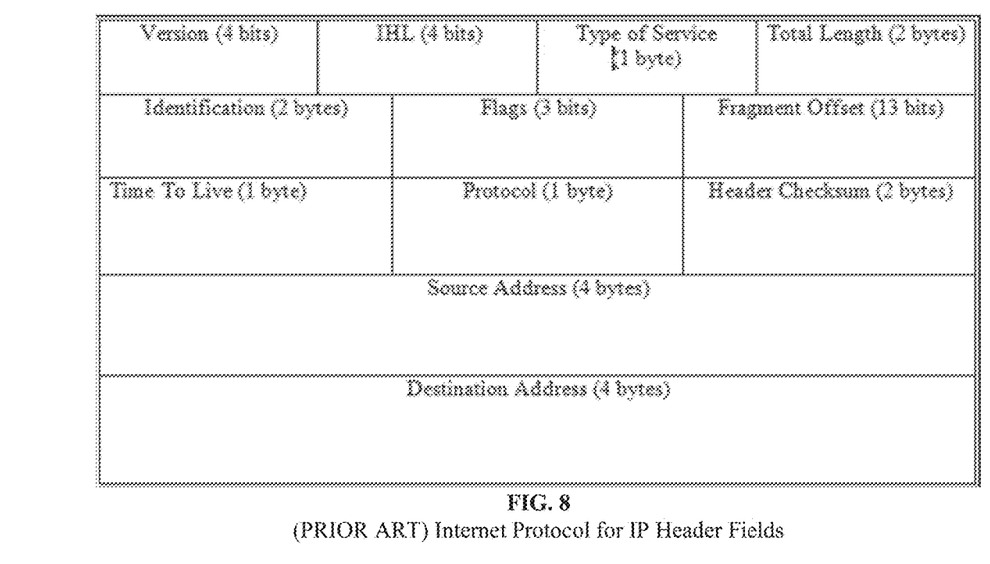
FIG. 8 shows standard Internet protocol IP header field, for reference.
Figure 10:
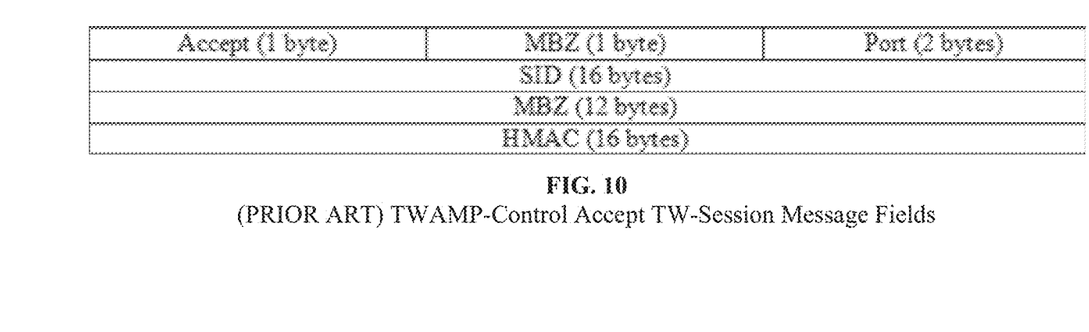
FIG. 10 shows TWAMP-Control Accept TW-Session Message fields, for reference.

The details of the calculations for the graph shown in FIG. 4 are described next. If the Accept-Session message size is represented as m, TCP header size is represented as T and the IP header size is represented as I, then maximum segment size (MSS)=maximum transfer unit (MTU)−T−I. Representing the number of Accept-Session messages in a TCP MSS as a, a=MSS/m, a=(MTU−T−I)/m. If the number of test sessions is represented as n, the TWAMP-Control setup time is represented as S and the delayed ACK time is represented as D, then S=(n/a)*D+r+c. An Accept-Session message size is 48 bytes. FIG. 10 shows TWAMP-Control Accept TW-Session Message fields, for reference. When Ethernet transport is used, the MTU frame size is 1500 bytes. Standard TCP header size is 20 bytes and standard IP header size is 20 bytes. FIG. 7 shows standard Internet protocol for TCP header fields and FIG. 8 shows standard Internet protocol IP header fields, for reference. Delayed ACK time is 500 milliseconds. MSS=1500−20−20=1460, the number of Accept-Session messages in a TCP MSS a=1460/48=30, which can be referred to as the blocking factor. TWAMP-Control setup time S=(n/30)*500+r+c, which is shown in the plot of FIG. 4, for n=400 and r+c=100. The disclosed enhancements lead to a considerable reduction in the TWAMP-Control setup time, as can be seen by comparing FIG. 3 and FIG. 4.

Figure 5:
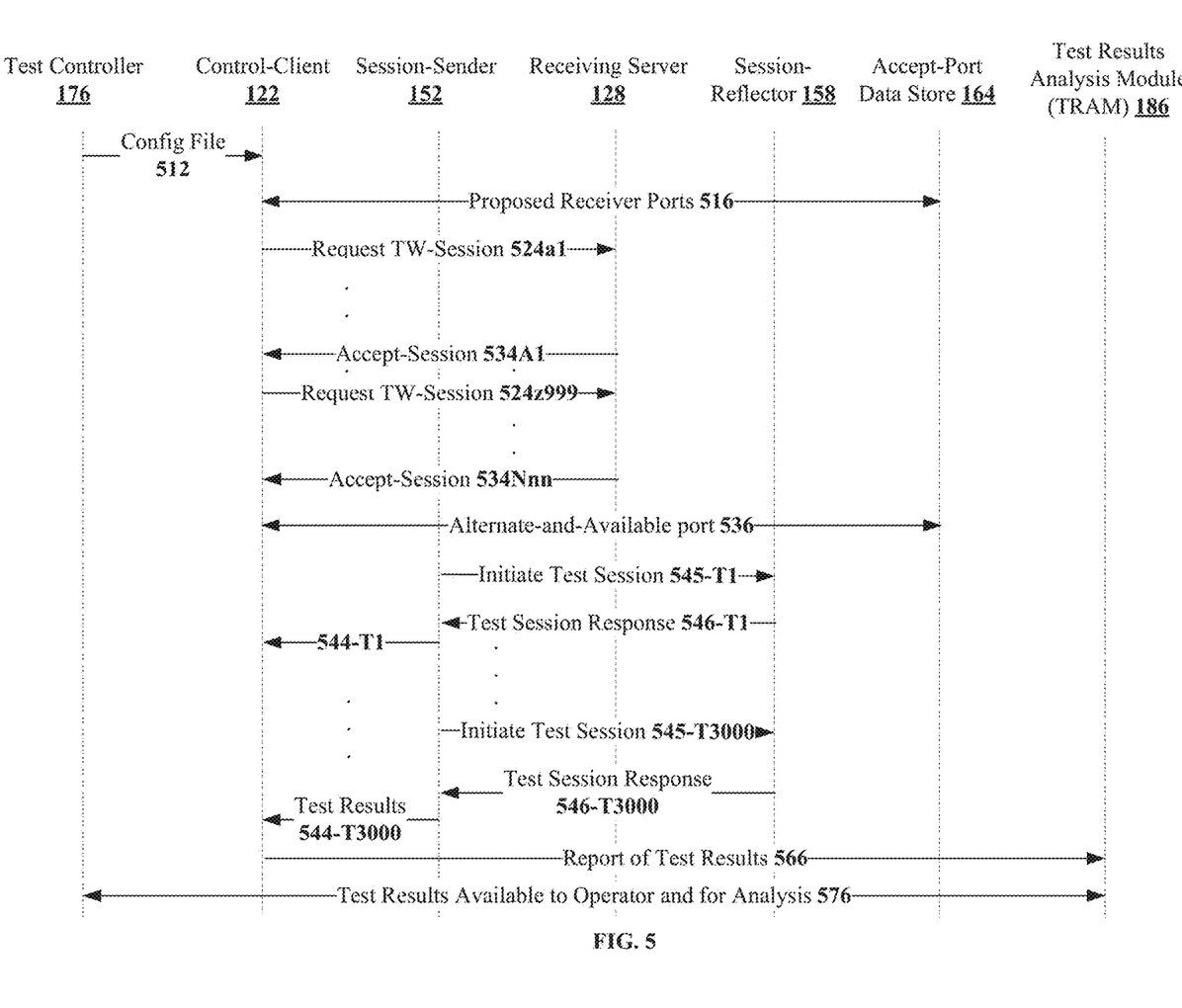
FIG. 5 shows an exemplary message flow for reducing the setup time of TWAMP control phase of the TWAMP protocol, according to one implementation of the technology disclosed.

FIG. 5 shows an exemplary message flow for the disclosed method and system for reducing the setup time of TWAMP control phase for setting up performance measurement tests for characterizing telecommunication transport networks. Test controller 176 sends a configuration file 512 to control-client 122 that runs as a VTA on the VTP, in one implementation. The configuration file includes proposed receiver ports for communication from a session-sender on the first network host to session-reflectors on other hosts for test sessions. Control-client 122 on network host A 112 initializes accept-port data store 164, storing the proposed receiver ports for two-way measurement sessions 516, indexed by an order in which receiver ports are allocated.

The TWAMP-Control phase includes the exchange of several messages over TCP, including a Request-TW-Session message 524a1-524z999 for every test session to be initiated between Session-Sender 152 and Session-Reflector 158. The Request-TW-Session message 524a1-524z999 includes a field that specifies the proposed receiver (destination) UDP port number to be used by the Session-Sender 152 in test packets 545T1-545 T3000 when 3000 test sessions are utilized. The receiving server acknowledges acceptance 534A1-534Nnn, using the Accept-Session message, of the availability of this proposed UDP port number in the session-reflector to ensure that test packets sent to this UDP port number are not discarded. Successive Request-TW-Session messages 524a1-524z999 with destination UDP port information for the test sessions are transmitted by control-client 122 to receiving server 128.

As described relative to FIG. 4 supra, because Ethernet transport is used, approximately 30 accept-session messages arrive in each block 534A1-534Nnn received back at control-client 122. When receiving server 128 finds that any of the proposed UDP port numbers for these test sessions are in use, it rejects the test session(s) and inserts, into the Accept-Session message, an alternative-and-available UDP port number to use. Control-client 122 updates accept-port data structure 164, storing the alternate-and-available receiver port 536 received in the Accept-Session message for the session.

An example of the receiver frame payload data structure is shown next.

```
typedef struct{
    unsigned int           sequence_number;
    uint64_t   timestamp;
        unsigned short error_estimate;
    unsigned short                  MBZ_1;
    uint64_t   rcvd_timestamp;
    unsigned int
        sender_sequence_number;
    uint64_t   sender_timestamp;
        unsigned short sender_error_estimate;
    unsigned short             MBZ_2;
    unsigned char              sender_TTL;
}__attribute__((packed)) twamp_receiver_frame_payload_t;
```

Continuing the description of the message flow diagram of FIG. 5, after the TWAMP-control phase is complete, session sender 152 can initiate test sessions 545-T1 through 545-T3000 with session reflector 158, using the UDP ports stored in accept-port data store 164 and receive test session responses 546-T1 through 546-T3000, for 3000 session tests.

A TWAMP-test session-sender message includes the following message fields.
Sequence Number (4 bytes)
Timestamp (8 bytes)
Error Estimate (2 bytes)
Packet Padding (Variable bytes)

An example test message sender frame data structure is shown next.

```
typedef struct{
    uint32_t       sequence_number;
    uint64_t       timestamp;
    unsigned short error_estimate;
}__attribute__((packed)) twamp_sender_frame_payload_t;
```

A TWAMP-test session-reflector message includes the following message fields.
Sequence Number (4 bytes)
Timestamp (8 bytes)
Error Estimate (2 bytes)
MBZ (2 bytes)
Receive Timestamp (4 bytes)
Sender Sequence Number (4 bytes)
Sender Timestamp (8 bytes)
Sender Error Estimate (2 bytes)
MBZ (2 bytes)
Sender TTL (1 byte)
Packet Padding (Variable bytes)

Control-client 122 reports test results 544-T3000 to test results analysis module (TRAM) 186. Test controller 176 receives test results 576 from TRAM 186 and provides the result reports for operators to utilize to analyze the network-under-test 145.

The hierarchy of the TWAMP streams and sessions can be represented as follows.
Stream 1
Session1
Session2
. . .
Stream2
Session1
Session2
. . .

Accept-port data store 164 is implemented as a hash table—an associative array that maps keys to values, in one case. An advantage of using the hash table is the minimal time taken to insert, access, and delete entries. When the maximum number of entries is known at the time of test creation, hash tables are very efficient. In this implementation, the accept-port is a 16-bit value this corresponds to $2^{16}-1$, so 65535 possible values. Networks often deploy a much lower number of streams. Hashing is the method of distributing the entries, which are the key/value pairs, into an array of buckets. Given a key, the hash function computes an index marking the location of the entry. The load factor is an important performance indicator for the hash table: load-factor=n/b where n is the number of entries as key/value pairs, and b is the number of buckets in the array. In one implementation, a load-factor of 0.5 has been empirically found to be optimal.

Index=f(key) where f is the hash function.
The index can be calculated as follows:

hash=hash_func(key,keylen,magic_number).

The magic_number is empirically calculated for different datasets. A magic number that is appropriate for one example dataset is 0x5a5ee1d9. Hash functionality includes mixing the key value using standard arithmetic operators, including shifts and exclusive-or operations using further magic numbers such as 0x5bd1e995 and 12 so that a resultant hash value spreads across the key address space to prevent collisions. The index can be calculated as follows.

Index=hash &(array-size−1)

In one use case, the array-size is selected to be $2^i$ in which the exponent i is close to the value of 2*n, to get a load-factor of 0.5 and to avoid the use of the modulo operator and use the 'and' operator, which can be implemented faster in the CPU hardware.

In one implementation an open addressing strategy, with linear probes with the probe interval set to 1, is utilized to prevent collisions. Using this strategy, when a new entry needs to be inserted, the index can be calculated using the key as described supra. If the entry is occupied, indicating a collision, the subsequent buckets are probed one at a time until an empty index is found and the entry is inserted there. Search for the entry proceeds in a similar manner. This can be represented mathematically as follows.

Let U be the universe of possible keys U->{0, 1, . . . , n}. Let H be the hash table with the smaller set of keys: H->{0, 1, . . . , m} where m<n.

Element with key k hashes to slot θ(k) using the hash function θU->H. The operations then become HASH-INSERT(T,x) with insert x in T[θ(k)] where k is key for x. If T[θ(k)] is not empty, use open addressing with linear probing to find slot r and insert x in T[r]. Operation HASH-DELETE(T,x) specifies delete x from T[θ(k)]. If x is not the value at T[θ(k)] then use open addressing with linear probing to find slot r and delete x from T[r]. Third operation is HASH-SEARCH(T,x): search for an element x with key k in T[θ(k)]. If the value doesn't match x, then use open addressing with linear probing to find slot r with a value that matches x and return it.

The stream parameters for each TWAMP test stream are listed next, with a session hash table for each test session.

```
typedef struct_twamp_pm_stream_params
{
    twamp_pm_stream_cfg_t cfg;
    char interface[IFNAMSIZ];
    struct ether_addr dst_eth;
```

```
    int client_sock;
    twamp_pm_sess_params_t *sess;   /* session hash table for each
                                        session */
```

The index into the session hash table is listed for each session in the example stream.

```
    int16 accept_idx;
    int8 error_flag;    /* Error in control setup */
    int8 ctl_complete;  /* Session control setup success */
    uint16 num_sessions;
    uint8 num_vlans;
    int8 route_added;
} twamp_pm_stream_params_t;
```

TWAMP performance metric stream configuration parameters are listed next. Index values can communicate packet stream characteristics along with one or more metrics to be measured.

```
typedef struct_twamp_pm_stream_cfg
{
    uint32 server;
    uint32 mask;
    uint32 gateway;
    StartTimeFormatType start_time_format;
    LightModeType light_mode;
    uint16 vlan: 13;
    uint16 pty_ctl:3;    /* vlan priority */
    uint16 iVlan:13;
    uint16 iPty_ctl:3;   /* inner vlan priority */
    uint16 twamp_port;
    uint16 qos_ctl;
} twamp_pm_stream_cfg_t;
```

TWAMP session parameters for each TWAMPPM test session follow.

```
typedef struct_twamp_pm_sess_params
{
    twamp_pm_sess_cfg_t cfg;
    uint64 next_pkt_tm;
    void *pCtx;
    void *pStrm;
    void *pStats;
} twamp_pm_sess_params_t;
```

TWAMP session configuration parameters are listed next.

```
typedef struct _twamp_pm_sess_cfg
{
    int fps;
    int frame_len;
    int frame_len_max;
    calcType calAvail;
    calcType calSD;
    PaddingType padding;
    uint16 dst_port;
    uint16 src_port;
    uint8 pty_data;  /* vlan priority */
    uint8 iPty_data; /* inner vlan priority */
    uint8 qos_dscp;
} twamp_pm_sess_cfg_t;
```

Figure 6:
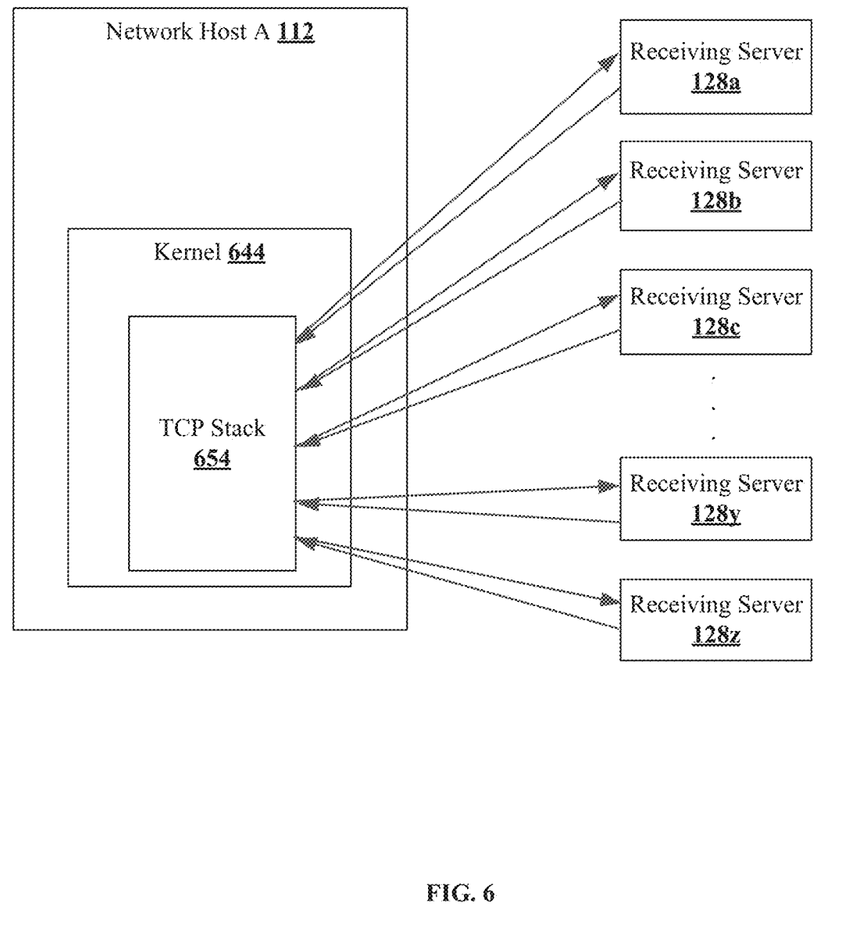
FIG. 6 shows an example block diagram of network host use of the stack for communicating between control-clients and receiving servers.
Figure 9:
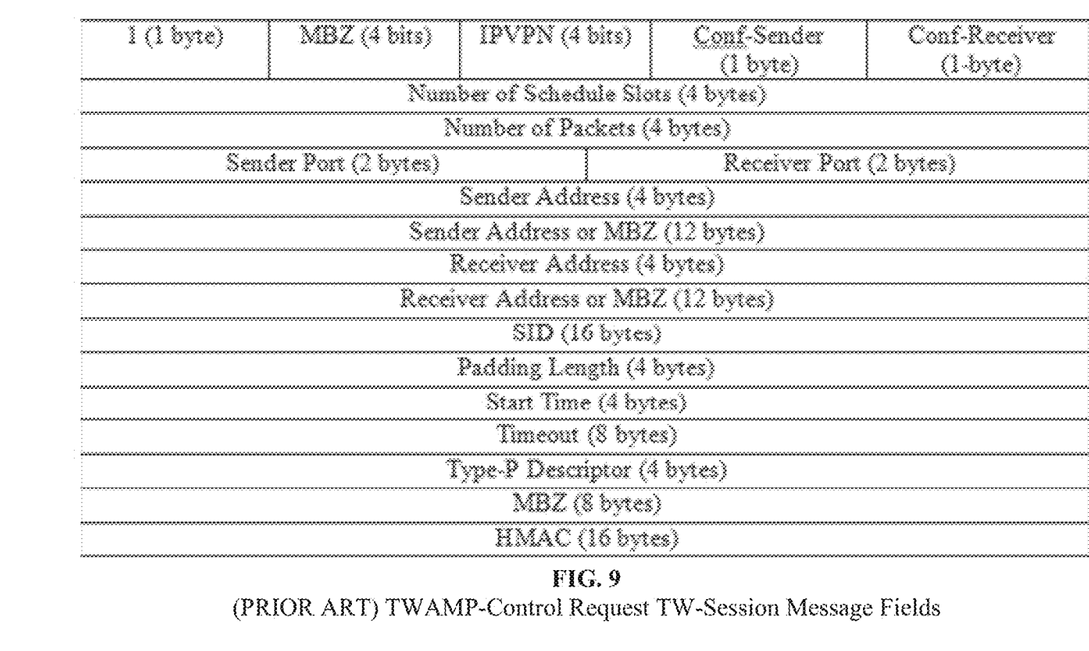
FIG. 9 shows message fields for TWAMP-Control Request TW-Session message, for reference.

FIG. 6 shows an example block diagram of network host use of the stack for communicating between control-clients and receiving servers. Network host A 112 includes kernel 644 with TCP stack 654. TWAMP-Control phase message exchange over TCP includes a Request-TW-Session message for every test session to be initiated, with destination UDP port information for the test sessions, to receiving servers. FIG. 9 shows message fields for TWAMP-Control Request TW-Session message, for reference. With the use of Ethernet transport, approximately 30 accept-session messages arrive in each block, as described relative to FIG. 4 supra. The Accept-Session messages include the UDP port number that the session-sender will use when sending test session messages to the session-reflector, ensuring that test packets sent to this UDP port number are not discarded. Receiving servers 128a, 128b, 128c, through 128y, 128z send blocks of accept-session messages to the control client via the TCP stack 654 in kernel 644, increasing the speed of node configuration for performance measurement testing of telecommunication transport networks by more than thirty times, when implementing thousands of test nodes. This increase in node configuration speed reduces the port setup time, making it practical to implement performance measurement testing on a large scale.

Computer System

Figure 11:
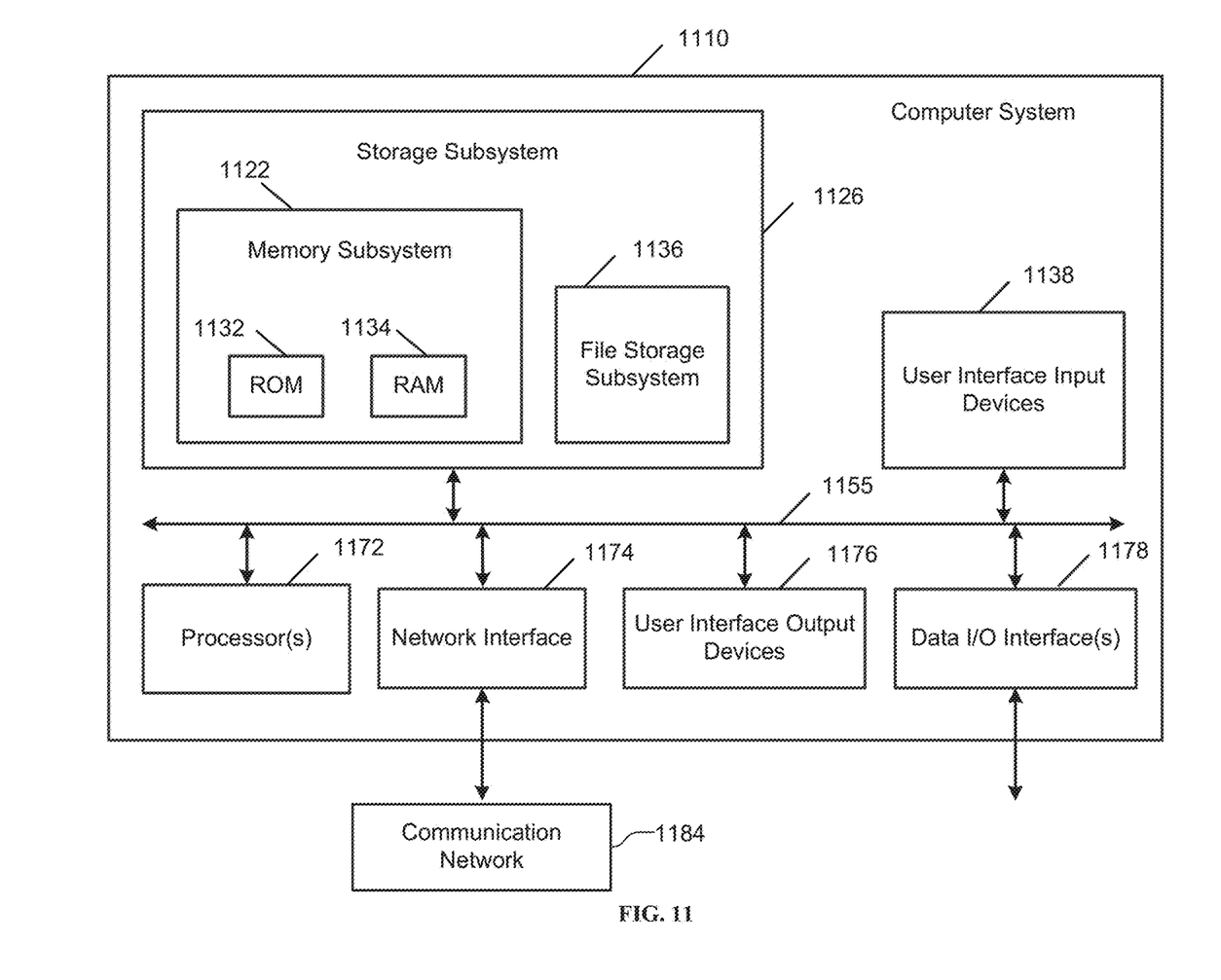
FIG. 11 is a block diagram of an exemplary system for increasing the speed of node configuration for performance measurement testing of telecommunication transport networks by reducing the port setup time for TWAMP with a large number of test sessions, according to one implementation of the technology disclosed.

FIG. 11 is a simplified block diagram of a computer system that can be used for increasing the speed of node configuration for performance measurement (PM) testing of telecommunication transport networks by reducing the port setup time for TWAMP with a large number of test sessions. Computer system 1110 includes at least one central processing unit (CPU) 1172 that communicates with a number of peripheral devices via bus subsystem 1155. These peripheral devices can include a storage subsystem 1126 including, for example, memory devices and a file storage subsystem 1136, user interface input devices 1138, user interface output devices 1176, and a network interface subsystem 1174. The input and output devices allow user interaction with computer system 1110. Network interface subsystem 1174 provides an interface to outside networks, including an interface to corresponding interface devices in other computer systems.

In one implementation, the network host 112 of FIG. 1 is communicably linked to the storage subsystem 1110 and the user interface input devices 1138. User interface input devices 1138 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include the possible types of devices and ways to input information into computer system 1110.

User interface output devices 1176 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1110 to the user or to another machine or computer system.

Storage subsystem 1126 stores programming and data constructs that provide the functionality of some or all of the modules and methods described herein. These software modules are generally executed by processors 1172 and can include graphics processing units (GPUs) or field-programmable gate arrays (FPGAs).

Memory subsystem 1122 used in the storage subsystem 1126 can include a number of memories including a main random access memory (RAM) 1134 for storage of instructions and data during program execution and a read only memory (ROM) 1132 in which fixed instructions are stored. A file storage subsystem 1136 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1136 in the storage subsystem 1126, or in other machines accessible by the processor.

Bus subsystem 1155 provides a mechanism for letting the various components and subsystems of computer system 1110 communicate with each other as intended. Although bus subsystem 1155 is shown schematically as a single bus, alternative implementations of the bus subsystem can use multiple busses.

Computer system 1110 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1100 depicted in FIG. 11 is intended only as a specific example for purposes of illustrating the preferred embodiments of the present invention. Many other configurations of computer system 1100 are possible having more or less components than the computer system depicted in FIG. 11.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

Some Particular Implementations

Some particular implementations and features are described in the following discussion.

In one implementation, a disclosed method of reducing the setup time of Two-Way Active Measurement Protocol (abbreviated TWAMP) control phase of the TWAMP protocol for performance measurement testing of telecommunication transport networks, includes at a first network host, initializing an accept-port data structure for storing ports of transmitted request messages for two way (abbreviated TW) measurement sessions, indexed as calculated using a hash function, described supra. In another implementation, the accept-port data structure can be indexed by an order in which receiver ports are allocated. The disclosed method also includes parsing a configuration file to populate the accept-port data structure, including proposed receiver ports for communication from a session-sender on the first network host to session-reflectors on other hosts; and repeatedly and in parallel, from a control client running on the first network host, communicating with receiving servers to set up pairwise test sessions between the session-sender and the session-reflectors using receiver port allocations from the accept-port data structure, for TW measurements that distinguish among the sessions, including transmitting a first message to a receiving server at the session-reflector, requesting the TW measurement session, wherein the first message includes the proposed receiver port at which to contact the session-reflector. The method further includes receiving and checking blocks of Accept-Session messages from the receiving server at the session-reflector and handling either case of acceptance of the proposed receiver port or of counter proposal of an alternate-and-available port, wherein the counter proposal of the alternate-and-available port in a particular Accept-Session message includes an alternate-and-available port from the receiving server to be used for the TW measurement session, instead of the proposed receiver port, and allocating the alternate-and-available port and updating the accept-port data structure by storing the alternate-and-available port received in the particular Accept-Session message; and using the ports stored in the accept-port data structure to initiate TWAMP messages in the pairwise test sessions.

This method and other implementations of the technology disclosed can include one or more of the following features and/or features described in connection with additional methods disclosed. In the interest of conciseness, the combinations of features disclosed in this application are not individually enumerated and are not repeated with each base set of features.

In one implementation of the disclosed method, the ports for two way measurement sessions are User Datagram Protocol (abbreviated UDP) ports.

In some disclosed methods, the configuration file is customized for set up of the receiver ports used by the first network host in the pairwise test sessions.

In one implementation of the disclosed method, the configuration file is customized by an operator via a user interface to specify the proposed receiver ports for communication from a session-sender on the first network host to session-reflectors on other hosts.

Another implementation of the disclosed method includes an additional network host parsing a configuration file customized to distribute an individualized set of receiver ports to the additional network host to set up the ports to be used in test sessions at the additional network host.

In some implementations of the disclosed method, the blocks of Accept-Session messages from the receiving server include a range of fifteen to thirty Accept-Session messages each. In other implementations, the blocks of Accept-Session messages from the receiving server include a range of thirty to sixty Accept-Session messages each, especially if the maximum transfer unit (MTU) increases in size in updates to the protocol in future years, as can be anticipated. In that scenario, the blocking factor could increase to approximately sixty accept-session messages per transmission.

In some implementations of the disclosed method, the network host is a virtual test platform (abbreviated VTP) running a virtual test application (abbreviated VTA). In other implementations, of the disclosed method, the network host can be a hardware-implemented network.

One implementation of a disclosed system for reducing the setup time of Two-Way Active Measurement Protocol (abbreviated TWAMP) control phase of the TWAMP protocol, includes a first network host running on a processor, including a parser, a control client, a session-sender, an accept-port data structure, receiver ports used for communications between the session-sender and remote session-reflectors. the disclosed system includes the first network host configured to initialize the accept-port data structure and to store receiver ports of transmitted request messages for two way (abbreviated TW) measurement sessions; the parser configured to parse a configuration file and to populate the accept-port data structure, including proposed receiver ports for communication from a session-sender on the first network host to session-reflectors on other hosts; and the control client configured to communicate, repeatedly and in parallel, with receiving servers to set up pairwise test sessions between the session-sender and the session-reflectors using receiver port allocations from the accept-port data structure, for TW measurements that distinguish among the sessions, wherein a TW measurement includes transmitting a first message to a receiving server at the session-reflector that requests the TW measurement session, wherein the first message includes the proposed receiver port at which to contact the session-reflector, the control client further configured to receive and check blocks of Accept-Session messages from the receiving server at the session-reflector and to handle either case of acceptance of the proposed receiver port or of counter proposal of an alternate-and-available port, wherein the counter proposal of the alternate-and-available port in the Accept-Session message includes an alternate-and-available port from the receiving server to be used for the TW measurement session, instead of the proposed receiver port, and allocate the alternate-and-available port and update the accept-port data structure by storing the alternate-and-available port received in the Accept-Session message. The disclosed system implementation includes use of the ports stored in the accept-port data structure to initiate TWAMP messages in the pairwise test sessions.

In one implementation of the disclosed system the ports for two way measurement sessions are User Datagram Protocol (abbreviated UDP) ports.

In some implementations of the disclosed system, the configuration file is customized for set up of the receiver ports used by the first network host in the pairwise test sessions.

In one implementation of the disclosed system, the accept-port data structure is indexed as calculated using a hash function. In another implementation, the accept-port data structure can be indexed by an order in which receiver ports are allocated.

In some implementations of the disclosed system, the configuration file is customized by an operator via a user interface to specify the proposed receiver ports for communication from a session-sender on the first network host to session-reflectors on other hosts.

One implementation of the disclosed system, further includes an additional network host parser configured to parse a configuration file customized to distribute an individualized set of receiver ports to the additional network host to set up the ports to be used in test sessions at the additional network host.

In another implementation, a disclosed system includes one or more processors coupled to memory, the memory impressed with computer instructions, the instructions, when executed on the processors, implement actions of the disclosed method described supra.

This system implementation and other systems disclosed optionally include one or more of the features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

In yet another implementation a disclosed tangible non-transitory computer readable storage medium impressed with computer program instructions to train a deep end-to-end speech recognition model. The instructions, when executed on a processor, implement the disclosed method described supra.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

I claim:

1. A method of reducing setup time of a Two-Way Active Measurement Protocol (TWAMP) control phase of a TWAMP protocol including the TWAMP control phase and a TWAMP test phase, the method including:
   communicating, by a control client of a first network host, with receiving servers to set up pairwise test sessions between a session-sender on the first network host and session-reflectors on other hosts using receiver port allocations from an accept-port data structure populated from a parsed configuration file;
   receiving and checking blocks of Accept-Session messages from a receiving server at one of the session-reflectors and handling either case of (i) acceptance of a proposed receiver port included in the parsed configuration file or (ii) a counter proposal of an alternate-and-available port returned from the receiving server to be used for a particular two-way (TW) measurement session, instead of the proposed receiver port;
   updating the accept-port data structure by storing information identifying the alternate-and-available port received in a particular Accept-Session message; and
   using information identifying ports stored in the accept-port data structure to initiate TWAMP messages in the pairwise test sessions.

2. The method of claim 1, wherein the ports for TW measurement sessions are User Datagram Protocol ports.

3. The method of claim 1, wherein an index for the accept-port data structure is calculated using a hash function.

4. The method of claim 1, wherein the parsed configuration file is customized for set up of the receiver port used by the first network host in the pairwise test sessions.

5. The method of claim 1, wherein the parsed configuration file is customized by an operator via a user interface to specify the proposed receiver port for communication from the session-sender on the first network host to the session-reflectors on the other hosts.

6. The method of claim 1, further including an additional network host parsing a configuration file customized to distribute an individualized set of receiver ports to the additional network host to set up the ports to be used in test sessions at the additional network host.

7. The method of claim 1, wherein the blocks of Accept-Session messages from the receiving server include a range of fifteen to thirty Accept-Session messages each.

8. The method of claim 1, wherein the blocks of Accept-Session messages from the receiving server include a range of thirty to sixty Accept-Session messages each.

9. The method of claim 1, wherein the first network host is a virtual test platform running a virtual test application.

10. A system including one or more processors coupled to memory, the memory loaded with computer instructions to reduce setup time of a Two-Way Active Measurement Protocol (TWAMP) control phase of a TWAMP protocol including the TWAMP control phase and a TWAMP test phase, the instructions, when executed on the one or more processors, implement actions including:
    communicating with receiving servers to set up pairwise test sessions between a session-sender on a first network host and session-reflectors on other hosts using receiver port allocations from an accept-port data structure populated from a parsed configuration file;
    receiving and checking blocks of Accept-Session messages from a receiving server at one of the session-reflectors and handling either case of (i) acceptance of a proposed receiver port included in the parsed configuration file or (ii) a counter proposal of an alternate-and-available port returned from the receiving server to be used for a particular two-way (TW) measurement session, instead of the proposed receiver port;
    updating the accept-port data structure by storing information identifying the alternate-and-available port received in a particular Accept-Session message; and
    using information identifying ports stored in the accept-port data structure to initiate TWAMP messages in the pairwise test sessions.

11. The system of claim 10, wherein the ports for TW measurement sessions are User Datagram Protocol ports.

12. The system of claim 10, wherein the parsed configuration file is customized for set up of the receiver port used by the first network host in the pairwise test sessions.

13. The system of claim 10, wherein the accept-port data structure is indexed using an index calculated using a hash function.

14. The system of claim 10, wherein the parsed configuration file is customized by an operator via a user interface to specify the proposed receiver port for communication from the session-sender on the first network host to the session-reflectors on the other hosts.

15. The system of claim 10, further including an additional network host parser configured to parse a configuration file customized to distribute an individualized set of receiver ports to the additional network host to set up the ports to be used in test sessions at the additional network host.

16. The system of claim 10, wherein the blocks of Accept-Session messages from the receiving server include a range of fifteen to thirty Accept-Session messages each.

17. The system of claim 10, wherein the blocks of Accept-Session messages from the receiving server include a range of thirty to sixty Accept-Session messages each.

18. The system of claim 10, wherein the first network host is a virtual test platform running a virtual test application.

19. A non-transitory computer-readable storage medium impressed with computer program instructions to reduce setup time of a Two-Way Active Measurement Protocol (TWAMP) control phase of a TWAMP protocol including the TWAMP control phase and a TWAMP test phase, the instructions, when executed on a processor, implement a method comprising:

communicating, by a control client of a first network host, with receiving servers to set up pairwise test sessions between a session-sender on the first network host and session-reflectors on other hosts using receiver port allocations from an accept-port data structure populated from a parsed configuration file;

receiving and checking blocks of Accept-Session messages from a receiving server at one of the session-reflectors and handling either case of (i) acceptance of a proposed receiver port included in the parsed configuration file or (ii) a counter proposal of an alternate-and-available port returned from the receiving server to be used for a particular two-way (TW) measurement session, instead of the proposed receiver port;

updating the accept-port data structure by storing information identifying the alternate-and-available port received in a particular Accept-Session message; and     using information identifying ports stored in the accept-port data structure to initiate TWAMP messages in the pairwise test sessions.

20. The non-transitory computer-readable storage medium of claim 19, wherein the ports for TW measurement sessions are User Datagram Protocol ports.

\* \* \* \* \*